G. R. MAUPIN.
ROLLER FLUE EXPANDER.
APPLICATION FILED APR. 1, 1916.
1,199,093.
Patented Sept. 26, 1916.
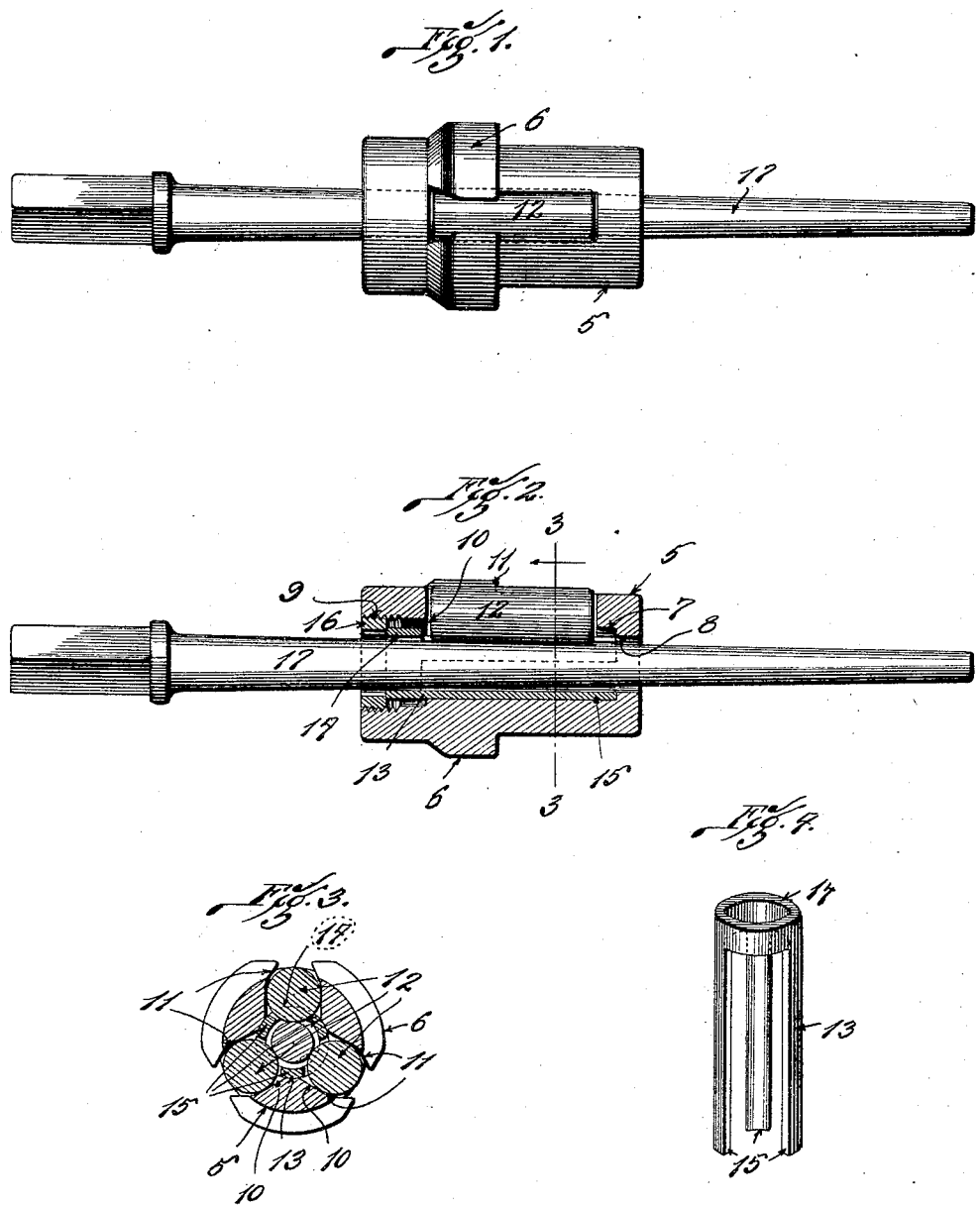

UNITED STATES PATENT OFFICE.

GRAVES R. MAUPIN, OF MOBERLY, MISSOURI, ASSIGNOR TO J. FAESSLER MANUFACTURING COMPANY, OF MOBERLY, MISSOURI, A CORPORATION OF MISSOURI.

ROLLER FLUE-EXPANDER.

1,199,093.

Specification of Letters Patent.

Patented Sept. 26, 1916.

Application filed April 1, 1916. Serial No. 88,340.

*To all whom it may concern:*

Be it known that I, GRAVES R. MAUPIN, a citizen of the United States, and resident of Moberly, Missouri, have invented certain new and useful Improvements in Roller Flue-Expanders, of which the following is a specification containing a full, clear, and exact description, reference being had to the accompanying drawings, forming a part hereof.

My invention relates to improvements in roller flue expanders, and is directed primarily to that type of flue expander wherein a cage having therein rollers is employed in conjunction with a mandrel for expanding boiler flues or tubes to form water tight joints between the flues or tubes and the boiler sheets.

The object of my invention is to construct a novel means for holding the rollers in place in the cage of the expander whereby to avoid the annoyances incident to the rollers falling from their seats in the cage and the consequent interference with the insertion of the mandrel.

With the above object in view my improvements consist in the novel construction and arrangement of parts as will be hereinafter fully clearly and concisely described, specifically set forth in my claims and illustrated by the accompanying drawing, in which, Figure 1 is an elevation of a roller flue expanding tool embodying my improvements; Fig. 2 is a longitudinal sectional elevation of the tool; Fig. 3 is a transverse sectional elevation of the tool taken on the line 3—3 of Fig. 2, and in the direction of the arrow on the line of section, and Fig. 4 is a detail perspective of the roller retainer.

Referring by numerals to the accompanying drawing, 5 designates the cage, or body portion of the tool which is substantially cylindrical and provided with an external annular flange 6 whereby to limit the insertion of the tool in the end of a flue or tube. Formed through this cage is a bore 7 which extends the length of the cage and is reduced at one end to form a flange 8 and threaded at 9 at its other end.

As shown in the drawing the wall of the tubular cage is provided with longitudinal slots 10 which extend only a partial length of the cage, including the annular outstanding flange 6.

The walls of each of the slots 10, are parallel from the inner perimeter to a point near the periphery of the cage, and from the last mentioned point, near the periphery of the cage, the walls of the slots 10 are extended toward each other to form the roller retaining flange 11.

Located in each of the slots is a roller 12, each of which is of a length substantially that of the slot, and each roller is of a diameter in excess of the thickness of the wall of the cage and of a diameter substantially equal to the width of the slot whereby each roller may extend beyond the periphery of the cage limited in its outward movement by the flanges 11 extended beyond the inner perimeter of the cage and yet be free to rotate between the walls defining the slots.

In order to prevent the rollers from falling inwardly into the cage from between the walls of the slots, I provide a retainer 13 which is of substantially tubular form, having at its one end a ring 14 from which extend the circumferentially spaced arms 15. This retainer is of a length including the ring and the arms less than the length of the cage so as to extend from the inturned flange 8 of the cage to and slightly beyond the inner ends of the thread 9. The function of this retainer is to hold between the arms 15 the rollers 12 in order to prevent them from falling from their places in the slots 10.

In order to hold the retainer in place against longitudinal movement relative to the cage, I provide a threaded ring 16 which is held by the threaded end of the cage against the end of the retainer. With the rollers thus held against falling out of place within the cage it is apparent that the mandrel 17 may be readily inserted between the rollers thereby obviating the annoyances and consequent loss of time which has heretofore been experienced in tools of this kind not equipped with roller retaining devices.

While I have shown the slots in the cage paralleling its longitudinal axis and the arms 15 of the retainer of like arrangement, I do not wish to be understood as limiting myself to this particular arrangement for the reason that the arrangement shown is of a manually fed tool, that is, the pressure required for the feeding of the expander into the end of a flue or tube is a manual operation, and in other tools of the same type employing identical cages and rollers, the slots and the rollers extend in angular relationship with the longitudinal axis of the cage, hence in this latter mentioned, that is the automatically fed tool the retainer will have its arms 15 extend at an angular relationship with the longitudinal axis of the cage.

Having thus described my invention, what I claim as new therein, and desire to secure by Letters-Patent of the United States, therefor is:

1. A roller flue expander comprising in combination a tubular cage having longitudinally disposed slots, a roller in each slot, a tubular roller retainer insertible lengthwise within the cage and having spaced arms for engagement with the rollers, and means within said cage at each end thereof for holding said roller retainer against axial movements relative to the cage, one of which means being removable from the cage.

2. A roller flue expander comprising in combination a tubular cage having longitudinally disposed slots, a roller in each slot, a tubular roller retainer insertible lengthwise within the cage and having spaced arms for engagement with the rollers, an inturned flange carried by the cage for engaging one end of said retainer and a removable ring having threaded connection with the cage for engaging the other end of the retainer.

In testimony whereof, I have signed my name to this specification, in presence of two subscribing witnesses.

GRAVES R. MAUPIN.

Witnesses:
 GEORGE BESTEN,
 IDA DULANY.

Copies of this patent may be obtained for five cents each, by addressing the "Commissioner of Patents, Washington, D. C."